(12) United States Patent
Hughes et al.

(10) Patent No.: US 6,927,748 B2
(45) Date of Patent: Aug. 9, 2005

(54) SPATIAL LIGHT MODULATOR IMAGING SYSTEMS

(75) Inventors: Jonathan R Hughes, Malvern (GB); Richard J Miller, Malvern (GB)

(73) Assignee: Holographic Imaging LLC, Birmingham, MI (US)

(*) Notice: Subject to any disclaimer, the term of this patent is extended or adjusted under 35 U.S.C. 154(b) by 0 days.

(21) Appl. No.: 10/813,299

(22) Filed: Mar. 31, 2004

(65) Prior Publication Data

US 2004/0196524 A1 Oct. 7, 2004

(30) Foreign Application Priority Data

Apr. 5, 2003 (GB) ............................................. 0307923

(51) Int. Cl.[7] .............................. G09G 3/00; G09G 3/36; G09G 5/00; G02F 1/03; G02F 1/135
(52) U.S. Cl. ........................... 345/32; 345/87; 345/204; 359/244; 359/259; 349/25
(58) Field of Search ............................. 359/22, 17, 15, 359/272, 292, 244, 245, 259; 353/30, 31; 349/201, 25–30; 345/32, 87, 204

(56) References Cited

U.S. PATENT DOCUMENTS 6,753,990 B1 * 6/2004 Payne et al. .................. 359/22

FOREIGN PATENT DOCUMENTS

| GB | 2 330 471 A | 4/1999 |
|----|-------------|--------|
| GB | 2 350 962 A | 12/2000 |
| GB | 2 350 963 A | 12/2000 |
| WO | WO 99/46768 | 9/1999 |
| WO | 00/40018 | 7/2000 |

OTHER PUBLICATIONS

Cameron, C.D., et al.; "Computational Challenges of Emerging Novel True 3D Holographic Displays"; SPIE Conference on Critical Technologies for Future of Computer (San Diego, USA), Jul.–Aug. 2000; pp. 129–140.

Stanley et al; "A Novel Electro–Optic Modulator System for the Production of Dynamic Images From Giga–Pixel Computer Generated Holograms"; Proc SPIE, 2000, pp. 13–22, vol. 3956, Jan. 24–27, 2000.

Jeon et al; "Image Tiling System Using Optically Addressed Spatial Light Modulator for High–Resolution and Multiview 3–D Display"; Proc SPIE, 2000, pp. 165–176, vol. 3957, 42–27 Jan. 2000.

* cited by examiner

Primary Examiner—Georgia Epps
Assistant Examiner—Jack Dinh
(74) Attorney, Agent, or Firm—Nixon & Vanderhye P.C.

(57) ABSTRACT

A spatial light modulator imaging system comprises an electrically addressed spatial light modulator (EASLM 4, 30) whose optical image output is projected onto different areas of an optically addressed spatial light modulator (OASLM, 6, 8, 31) in a sequence. The OASLM carries electrodes which allow separate areas to be selectively addressed by application of a voltage whilst receiving light from the EASLM. The combined output from all areas of the OASLM forms a visible image to an observer (11). When illuminated by coherent light the OASLM may produce a holographic image, otherwise incoherent light is used to provide a two dimensional image. The OASLM in one example contains a layer of nematic liquid crystal material between two cell walls both treated with an alignment layer providing low tilt surface alignment that is parallel in opposite direction; the product of layer thickness d and material birefringence Δn approximately equals one quarter of the wavelength λ of read light (12, 37). Other types of nematic devices may also be used, with cell parameters arranged to give enhanced diffraction efficiency.

13 Claims, 4 Drawing Sheets

This uses an EASLM in which the inverse (−ve) image has to be loaded in a separate operation.

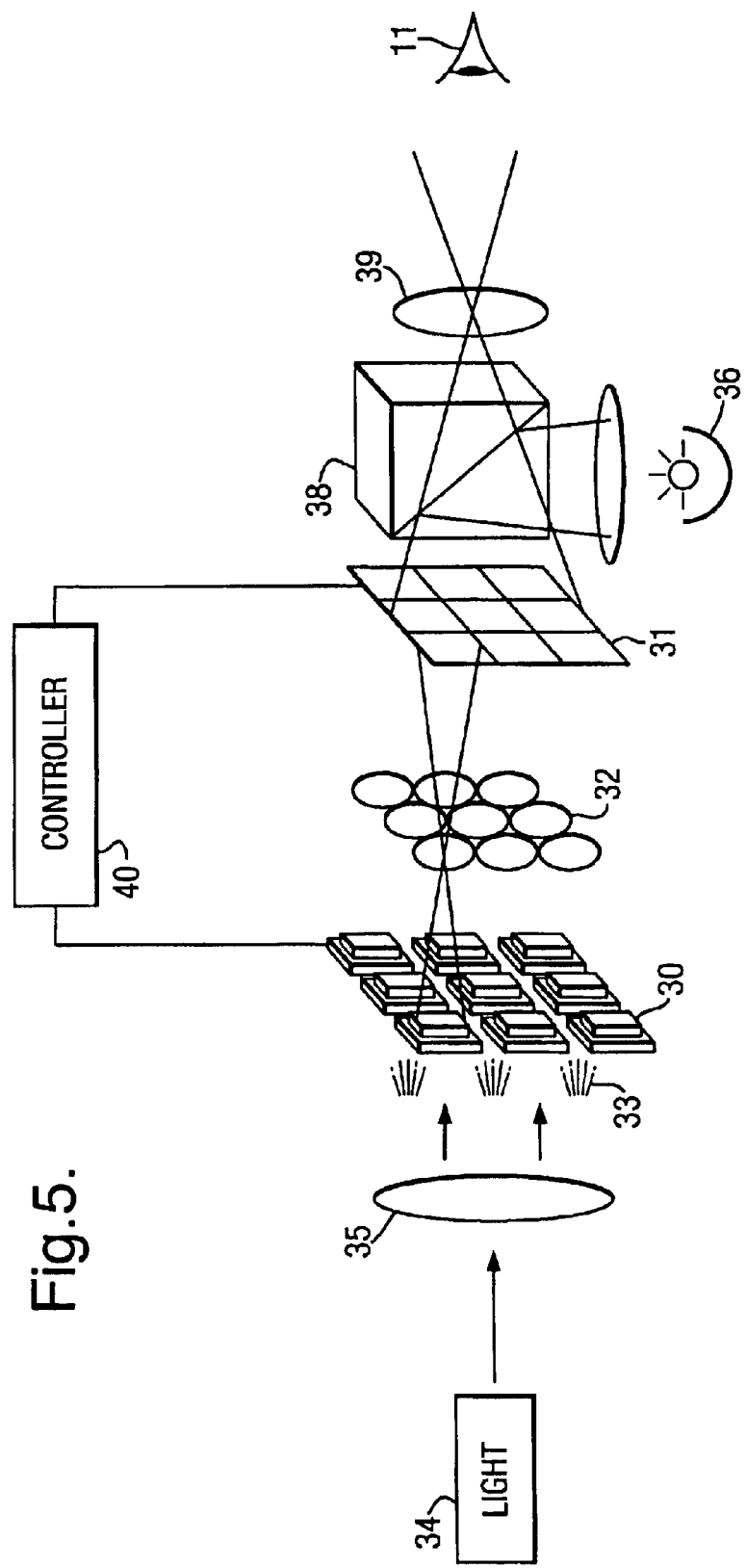

SPATIAL LIGHT MODULATOR IMAGING SYSTEMS

This application claims priority to GB Application No. 0307923.3, filed 5 Apr. 2003. The entire contents of this application is incorporated herein by reference.

TECHNICAL FIELD

This invention relates to spatial light modulator (SLM) imaging systems that use both an electrically addressable spatial light modulator (EASLM) and an optically addressable spatial light modulator (OASLM) to provide visible images to an observer; particularly systems displaying three dimensional images.

BACKGROUND

Re-configurable SLMs based on liquid crystal (and other types of) devices are widely used for controlling and manipulating optical beams. In diffractive mode they may be used for three dimensional (3D) imaging [BROWN, C V and STANLEY, M, UK Patent Application GB2330471, Production of Moving Images for Holography] and for routing optical signals in telecommunications networks The SLM modulates the complex amplitude of an incoming wave front (i.e. changes its phase and/or amplitude), which causes it to propagate in the desired manner. The SLM generally comprises a liquid crystal panel containing a number of individually addressed pixels, onto which a diffraction pattern or Computer Generated Hologram (CGH) is written [CAMERON, C D et al, SPIE Conference on Critical Technologies for the Future of Computing (San Diego, USA), July–August 2000, *Computational Challenges of Emerging Novel True 3D Holographic Displays*].

CGH 3D display systems typically use a computer to generate and/or store electronic copies of the hologram. This hologram is then replayed on an SLM which is switched to modulate (in transmission or reflection) light from a source which then passes through suitable replay optics, thereby providing a visible three-dimensional image to observers.

In one known system used in the production of three dimensional (3D) images, a single EASLM is addressed to produce successive different images which are imaged sequentially onto an OASLM arranged in a matrix of segments which forms a complete display. Once all the component images have been written to the OASLM a complete image or pattern can be presented to an observer, e.g. by illumination of the whole OASLM matrix by laser read light. This is described in U.S. Pat. No. 6,437,919, WO-GB98/03097, GB2330471, and has been described as Active Tiling™. This system relies on high speed switching in the EASLM and bistability in the OASLM material to retain the switched image whilst the read light is applied, to give a flicker free display.

Typically a SLM includes a layer of liquid crystal material arranged between two electrode-bearing walls to form a liquid crystal cell. The material is switched by application of an electric field to the liquid crystal material, e.g. by electrical waveforms applied to the electrodes.

A typical EASLM comprises a liquid crystal cell formed by two walls enclosing a layer of nematic or smectic liquid crystal material. Transparent electrode structures are formed as strips of row electrodes on one wall and strips of column electrodes on the other wall. Electrode intersections define pixels where the optical state of the liquid crystal material is switched by application of an electric voltage to appropriate row and column electrodes. The electrodes receive electrical signals from driver circuits controlled by a display controller. One known smectic EASLM uses an integrated circuit backplane, and DC balance is achieved by addressing to form a positive image followed by addressing to form the inverse, i.e. a negative image.

A typical OASLM is basically similar to the EASLM but includes a layer of a photosensitive material between electrodes on one wall and a bistable ferroelectric liquid crystal material. In some examples the electrodes are segmented so that electrical contact is made separately to each segment; in this way an image may be applied to more than one segment (commonly all segments) but a voltage only applied to one segment to effect latching of the image only at that one segment. The OASLM is addressed by application of a voltage to the electrodes and simultaneous application of light to selected parts of the photosensitive material. This combination switches the liquid crystal material at illuminated parts whilst other non-illuminated parts remain unswitched. A display is viewable from the side of the OASLM remote from the photosensitive layer.

A disadvantage of bistable ferro electric devices is their low diffraction efficiency which results in a low level of image brightness.

SUMMARY

The above problem is reduced, according to the present invention, by using monostable nematic liquid crystal OASLM together with an addressing technique that allows display of an image despite switched pixels decaying back to an unswitched state.

According to this invention a spatial light modulator imaging system comprises:

at least one electrically addressed spatial light modulator EASLM;

a monostable optically addressed spatial light modulator OASLM;

arranged to receive addressing light from the EASLM through an optical system;

a controller for loading images on the EASLM, then optically onto the OASLM;

a controller for applying write voltages to the OASLM simultaneously with application of addressing light;

a read light for illuminating the OASLM to provide visible images;

the arrangement being such that a plurality of images are read into the EASLM and thence onto the OASLM at a rate sufficient to present a stable image to an observer.

The display is observed by reflection of light from the OASLM directly or through a Fourier lens. The illuminating light may be from a broadband source or a laser. In the latter case a holographic display may be formed.

Preferably the OASLM is arranged to give maximum diffraction efficiency; for example using properties of an anti parallel aligned nematic layer with $\Delta n.d=0.25\lambda$ to give a good diffraction grating (diffraction efficiency up to about 44%); $\Delta n$ is nematic birefringence, d is layer thickness, and $\lambda$ is wavelength of read light, typically green (about 500 to 550 nano meters) for colour displays. Such an arrangement gives enhanced holographic performance. In contrast a chiral smectic C layer has a diffraction efficiency of less than 10%, typically about 4%.

Other nematic alignments and $\Delta n.d$ products may be used. For example 180° twist with parallel in the same direction alignment and an amount of chiral dopant. Other nematic devices that may be used include: twisted (90°) nematic; super twisted (270°) nematic; n-cell (360°) twist; hybrid aligned nematic (HAN) cells with a planar alignment on one wall and homeotropic alignment (90° to wall) on the other wall. Pleochroic dyes may be incorporated in small amounts to absorb stray light.

The system may have a single EASLM addressing a single OASLM or OASLM segment, or addressing a plurality of OASLMs or OASLM segments. The system may have a plurality of EASLMs and OASLMs or OASLM segments; alternatively a plurality of EASLMs addressing a single OASLM or OASLM segment.

The system may have two EASLMs associated with a segmented OASLM arranged so that one EASLM contains alternatively a positive image and a negative image whilst the other EASLM contains the inverse. This allows writing of successive positive images onto the OASLM without dead periods during the time negative images are on the EASLMs to give DC balance therein if such DC balance is required.

The system may display monochrome information, or colour information in a two or three or four frame sequential manner. For a colour 3-D display, at least three different wavelength lasers are used to illuminate the OASLM sequentially each wavelength being associated with one of three different frames of images. For some displays, two colours may provide sufficient information; this requires only two frames of different colours.

A Fourier transform lens may be arranged between the OASLM and an observer.

The OASLM may be a single large cell with segmented electrodes whereby a voltage may be applied independently to any one area of the liquid crystal material between opposing segment electrodes. Alternatively, the OASLM may be a single large cell with a single electrode in combination with an optical shutter. Another OASLM may be formed by a mosaic of smaller OASLMs connected together. The OASLM may be arranged in a matrix of m×n segments or independent smaller OASLMs, where m and n are the number of elements in rows and columns and where m and n may have the same or different values.

When not receiving information with a WRITE voltage or light pattern, the OASLM may receive a DC or AC balancing voltage which may also assist in increasing the decay time of the nematic material. For some displays, it is desirable to increase the decay time of the nematic material then switch off rapidly, for example between frames in frame sequential colour displays. Such effect may be obtained by a holding voltage near a threshold to lengthen decay followed by removal of voltage to affect a quick switch to OFF. Alternatively, a two-frequency type of material may be used in a twisted nematic arrangement. In such a material the dielectric anisotropy is negative above a critical frequency and positive below that frequency. This allows use of a high frequency signal to obtain a quick turn OFF and lower frequency to turn ON as normal.

BRIEF DESCRIPTION OF THE DRAWINGS

The invention will now be described, by way of example only, with reference to the accompanying drawings in which:

FIG. 5 shows an alternative system to FIG. 1 having an array of EASLMs imaged onto a large OASLM having an array of segments, each segment corresponding to one of the EASLMs;

DESCRIPTION OF EMBODIMENTS

Figure 1:
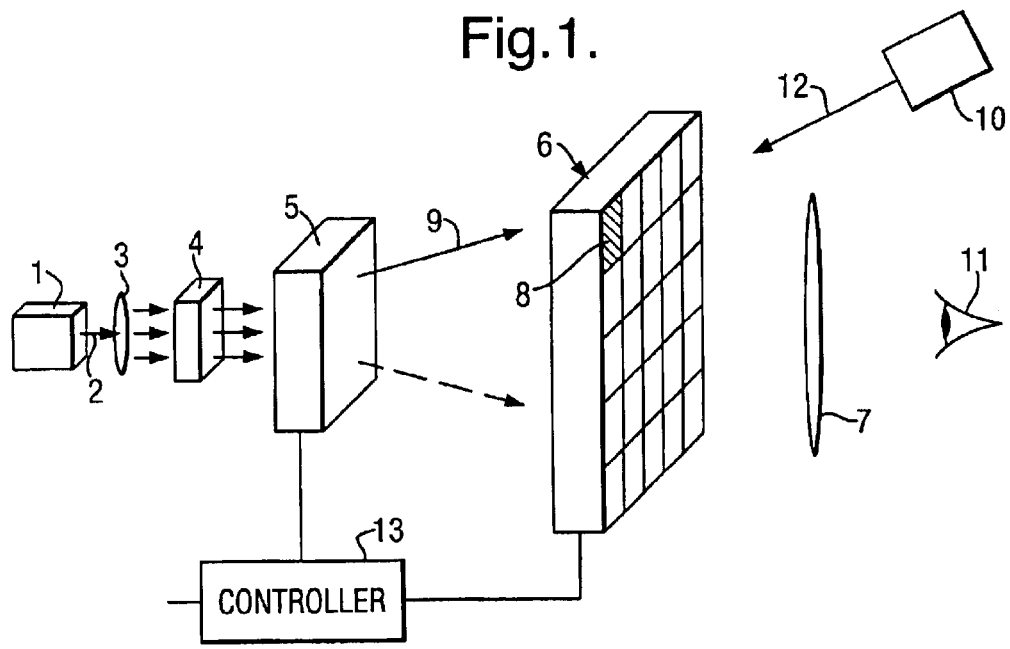
FIG. 1 shows schematically an imaging system having a single EASLM imaged onto a large OASLM.

Systems like that shown in FIG. 1 have been termed Active Tiling™ and described in more detail in patent numbers U.S. Pat. No. 6,437,919, WO-GB98/03097, and GB2330471. The system may be used for large area two-dimensional displays, or for three dimensional holographic image displays. Such holographic displays may be the so-called computer generated holograms (CGHs). Prior art systems employ bistable ferro electric OASLMs which have a low diffraction efficiency but have advantages of high speed and bistability.

As shown in FIG. 1, a reconfigurable holographic display comprises a light source 1 whose output 2 is directed through a lens 3 onto an electrically addressable spatial light modulator (EASLM) 4. This EASLM 4 may be a liquid crystal modulator in which a layer of smectic liquid crystal material is held between two glass walls. Column electrodes on one wall and row or line electrodes on the other wall form a matrix of addressable elements or pixels at electrode intersections. When a voltage is applied to a pixel, the liquid crystal material rotates under the applied electric field to modulate light transmission. One suitable EASLM uses known active matrix addressing to obtain high switching speeds; such devices are obtainable from e.g. DISPLAYTECH INC or MICROVUE LTD. Other devices using smectic, nematic, or cholesteric material may be used. Other types of EASLM that may be used include silicon active backplane devices, and micro mirror devices.

In front of the EASLM 4 is an optical arrangement 5, an optically addressable spatial light modulator (OASLM) 6, and a further lens 7. The optical arrangement may be a micro lens array for focussing multiple images of the EASLM 4 onto a corresponding part of the OASLM 6, and may incorporate optional shutters for controlling light onto a part of the OASLM 6 in a sequence. The OASLM 6 (described in more detail later) comprises a layer of a nematic liquid crystal material between two glass walls. Both walls carry transparent segment electrodes and one wall carries a layer of photosensitive amorphous silicon. As shown the OASLM 6 is formed by twenty five separate segments 8 each one being independently addressable and arranged in a 5×5 matrix, other size matrices can be formed.

In one embodiment, an image to be written into one segment 8 of the OASLM is loaded into the EASLM and many copies are optically tiled onto the complete OASLM. The segment 8 required to be addressed has suitable voltage applied thereto which causes its photosensitive layer to react to incident light. This incident light modulates the applied voltage which in turn modulates locally the director alignment of nematic material across the segment. As a result of this modulated alignment the reflective (or transmissive) properties of the nematic layer are also modulated. Thus when illuminated by a read-light source 10 an image is visible at the segment. Successive segments are illuminated by an appropriate image from the EASLM.

By this means a large pattern formed of many separate sub images can be formed on the OASLM 6. Images may be observed either by reflection of light 12 from or by transmission of light through the OASLM 6. Thus a pattern of light from the EASLM 4 is transmitted from the OASLM 6 to an observer 11. For a monochrome display a single light 10, 12 is used. For a colour display, three different light sources may be used, or a single light source with three different switchable colour filters used.

Alternatively the OASLM may be formed with a single continuous sheet electrode on each cell wall. Such an arrangement requires the optical arrangement 5 to incorporate an array of shutters which direct light from the EASLM to one segment area 8 of the OASLM at a time.

In another embodiment, the OASLM is formed of several separate OASLMs placed together to form a large display.

A computer 13 controls the signals applied to the EASLM 4 and OASLM 6 and contains electronic copies of images to be displayed. The images to be displayed may be two dimensional images, or be diffraction patterns such as computer generated holograms (CGH) in a known manner for providing three dimensional or quasi three dimensional, or auto stereo or horizontal parallax displays. Such CGH may be generated in the computer 13 or generated externally and stored within the computer for display as required.

A description of EASLMs and OASLMs used with holographic displays is described in patent application EP-1064651, PCT WO-00/2350472, GB98/04996, and GB02/29154.0 (P7224).

Figure 2:
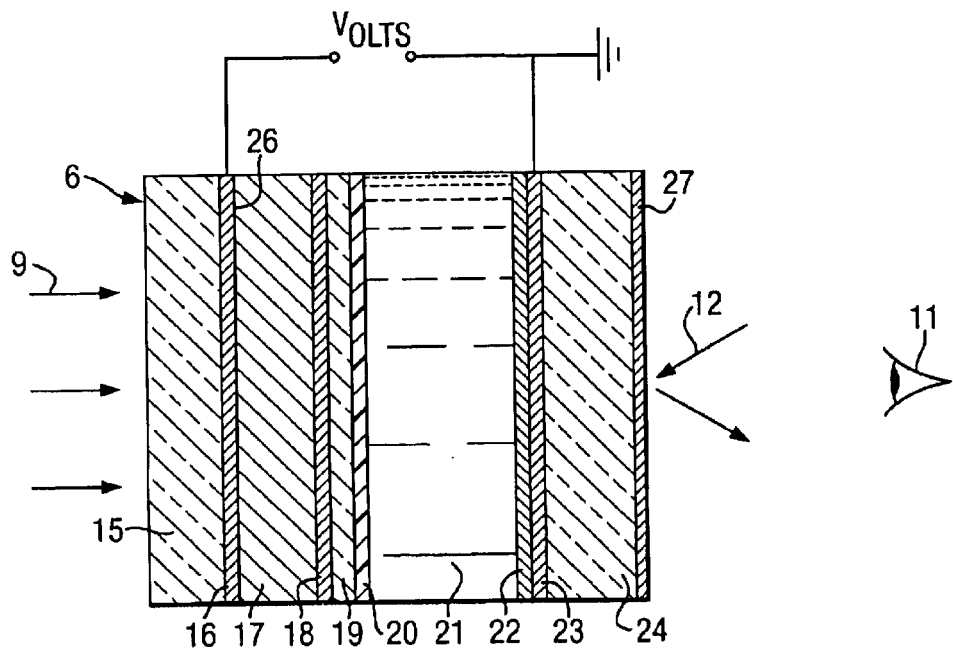
FIG. 2 shows schematically a cross section of an OASLM suitable for use in the system of FIG. 1.

The present invention uses particular mono stable switching characteristics of the OASLM, namely birefringence ($\Delta n$) layer thickness (d)=$0.25\lambda$ ($\lambda$=wavelength) needed to give a good diffraction grating. Therefore the construction of the OASLM will be described in more detail as follows:

The structure of an OASLM is illustrated in FIG. 2. From left to right in FIG. 2, the construction is as follows; a first glass layer 15, an indium tin oxide layer 16 which forms a first transparent electrode, a silicon photosensor layer 17, an optional light blocking layer 18, an optional mirror 19, a first alignment layer 20 which may be formed by brushing a polyimide layer, a liquid crystal (LC) layer 21, a second alignment layer 22 a second indium tin oxide electrode layer 23 which may be connected to earth, a second glass layer 24, and an optional polariser 27. A voltage source 25 is coupled to the two electrodes 16, 23 in order to control the switching of the OASLM 6.

For an OASLM having enhanced diffraction efficiency a Fréedericksz type cell is used. This comprises a layer of nematic liquid crystal material with alignment layers arranged in anti-parallel alignment and with low tilt, e.g. less than 10° surface tilt.

The thickness of the layer 21 is important; for maximum diffraction efficiency the $\Delta n.d$ product should be close to $\lambda/4$, where $\Delta n$ is the material birefringence, d layer thickness and $\lambda$ the wavelength. The $\lambda/4$ figure arises because of a double passage of read light through the liquid crystal layer 21. For a monochrome display $\lambda$ is the wavelength of the read light 12. For a full colour display $\lambda$ is usually about 500–550-nm i.e. in the mid range of the red, green and blue wavelengths. Higher pretilts may be used, e.g. above about 10°, in which case the layer thickness may be increased to compensate for the reduced retardation.

For an OASLM operating with a twisted nematic type cell effect (a 90° twist), then the alignment layers 20, 22 are arranged orthogonal and the polariser 27 aligned parallel (or orthogonal) to the alignment on the adjacent layer 22. For other cell types, the alignment is changed in an appropriate manner. For example a n-cell may have parallel in the same direction alignment with a small amount, <1% of a chiral material such as CB15 (Merck material). Other types of liquid crystal devices may be used; for example STN with 270° of twist, and hybrid-aligned nematic (HAN) with planar and homeotropic aligned surfaces, and other device types.

One suitable liquid crystal material is ZLI-2293 (a Merck GmbH material)

The junction between the silicon 17 and electrode layer 16 acts as a diode 26; when a voltage of a first positive polarity is applied between the electrodes this diode 26 is forward biased and most of the voltage will be dropped across the LC layer 21, whilst when a voltage of a second, negative polarity is applied to the electrodes, most of the voltage will be dropped across the silicon layer 17 unless write light 9 is applied in which case the voltage will be dropped across the LC layer 21. The bias of the second polarity is referred to as the "photosensitive directions". When the bias is in the photosensitive direction and with no illumination, the voltage appearing across the LC layer 7, $V_{lc}$, is given by the capacitive division of the total voltage appearing across the OASLM 6:

$$V_{lc}=C_{Si}/(C_{lc}+C_{Si})$$

where $C_{Si}$ and $C_{lc}$ are the capacitances of the silicon and LC layers respectively. As charge is generated in the Si layer, so the voltage across the LC rises.

In the ideal case a Schottky barrier is formed in the OASLM by the silicon and indium-tin-oxide (ITO) transparent electrode junction 26. This gives behaviour some way between that of a photodiode and a photoconductor. If ohmic contacts are made then photoconductor behaviour results. The major problem with a pure photoconductor is the dark leakage current which is not sufficiently low to keep the voltage from dropping across the LC in a non-illuminated addressed state. A photodiode requires the deposition of p-doped, intrinsic and n-doped Si and is a complicated process. For a photodiode 26 under reverse bias, when a photon is absorbed to produce an electron-hole pair in the Si, the hole and electron are separated and drift to the contacts. The blocking contacts stop the carriers so that once they are collected the response is complete. The photocurrent varies linearly with the light intensity over a wide range of intensities because one electron-hole pair is collected for each absorbed photon.

With the application of a positive applied voltage the photodiode is forward biased so that all of the voltage should drop across the LC. The presence of a write light 12 should not affect the state of the LC 21 significantly, with a positive voltage applied. When a negative applied voltage is applied, the photodiode 26 is reverse biased, blocking the current, so that ideally the voltage across the LC 21 is unchanged. When a write light 12 illuminates the photodiode 26 a photocurrent charges the LC 21 to a negative voltage and causes switching. This voltage is maintained across the LC 21 until the drive voltage goes positive again.

Figure 3:
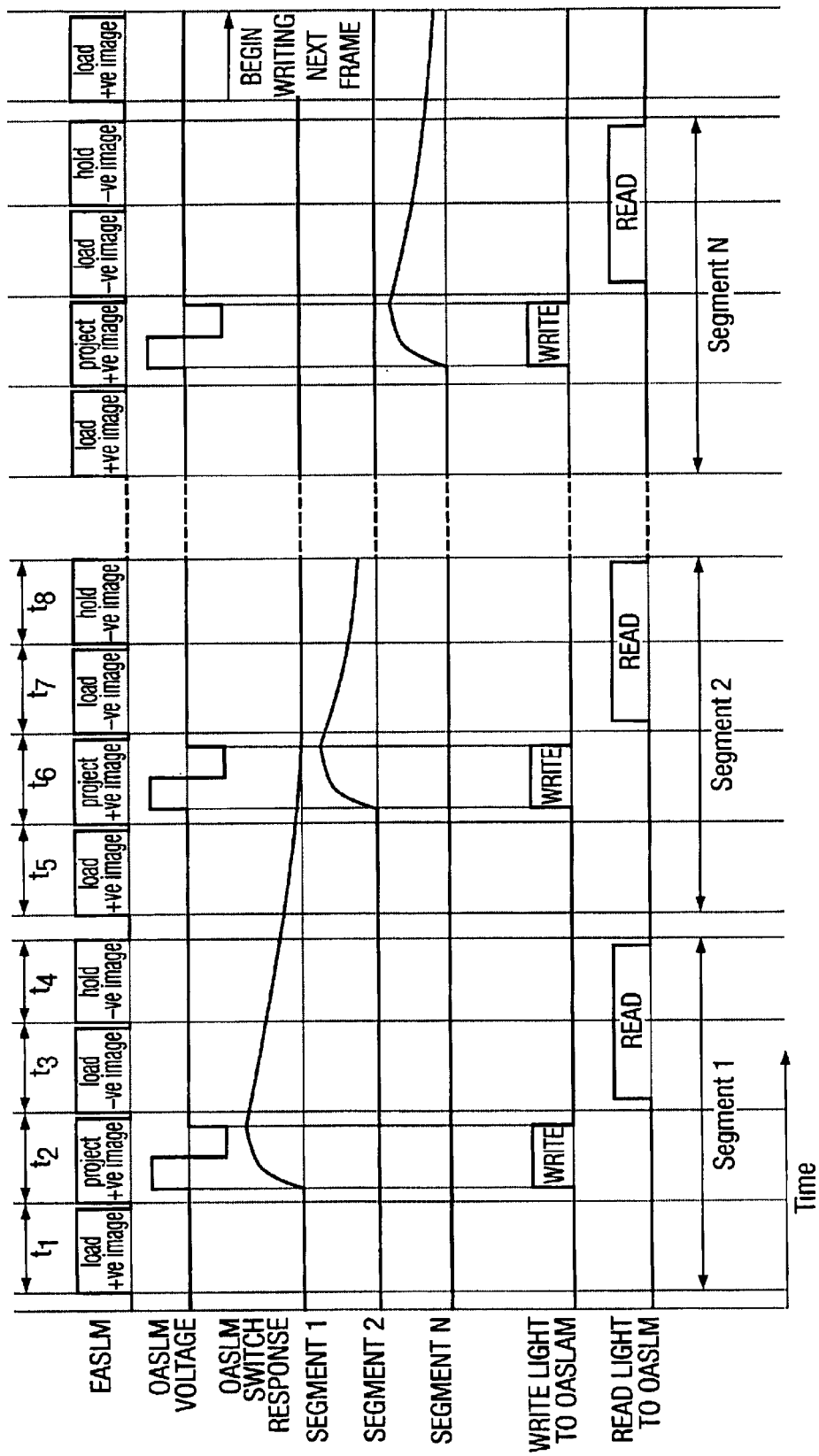
FIG. 3 is one timing diagram showing control of the system of FIG. 1.

The behaviour of the liquid crystal material 21 in response to an electrical signal, the combination of received light induced voltage and an applied voltage, is seen in FIG. 3. During application of a voltage, visibility of the pattern increases up to a maximum value representing a fully switched ON state. On removal of the voltage, the material 21 returns to its unswitched or OFF state where no pattern is visible. The time to switch to ON depends upon material 21 characteristics and applied voltage level. The time to decay OFF depends upon material 21 characteristics of viscosity and layer thickness. For some materials the decay time can be controlled by application of a small voltage.

FIG. 3 shows timing information for switching "N" different segments of a layer 21 for a monochrome display. Illustrated are: activity at the EASLM 4; voltage applied to the OASLM 6 by the controller 13; optical response at segments 1, 2, and N in a first frame time; write light onto the OASLM for each segment 1 to N; read light for each segment 1 to N; time to address and read segments 1 to N; time to address all segment, in a first frame time and the start of frame 2. For this monochrome case, the addressing continues without a break between addressing segment N at the end of a first Frame n and addressing (for the second time) segment 1 at the beginning of a second frame Frame n+1.

The sequence of events shown in FIG. 3 is as follows:

First time period t1. Positive image information for displaying on a first segment is loaded onto the EASLM 4 from the controller 13; no other activity takes place except for decay of any previously displayed information.

Time period t2. The positive image on the EASLM is projected onto segment 1 of the OASLM 6 by operation of the write light; a bi-polar voltage pulse is applied to segment 1 which causes addressing of the liquid crystal material in segment 1 by the combined action of applied voltage and light, this is shown by the OASLM switch optical response rising from zero to its maximum value. The voltages may be a series of bipolar pulses that constitute a short square wave as long as the DC balance requirement is met; other AC signals may also be used.

Time periods t3, t4. The read light 10, 12 is applied during both periods and an observer can see the positive image (or, for holographic viewing, a diffraction pattern) written onto segment 1 of the OASLM; a negative image is loaded into the EASLM for t3 and then held for t4 to provide a DC balance (net zero voltage) on the EASLM. The end of period t4 marks the end of addressing segment 1.

The above activities are then repeated for segments 2 to N in turn. The end of addressing segment N marks the end of frame 1 and the whole of the OASLM has been addressed. The next frame is then addressed with the same or amended information as necessary.

It can be seen that light from segment 1 has decayed to zero before segment N is addressed. This is not a problem providing the refresh rate (number of time that a given segment is addressed per second) is above about 25 frames/second thanks to retinal persistence of observers, and providing that the light output from each segment (area under OASLM curve in FIG. 3) is large enough.

Colour displays may be achieved by the known technique of field sequential display. In this a complete frame is formed by display of a first sub-frame of a first colour, followed by a second and then a third sub-frame of different colours.

Figure 4:
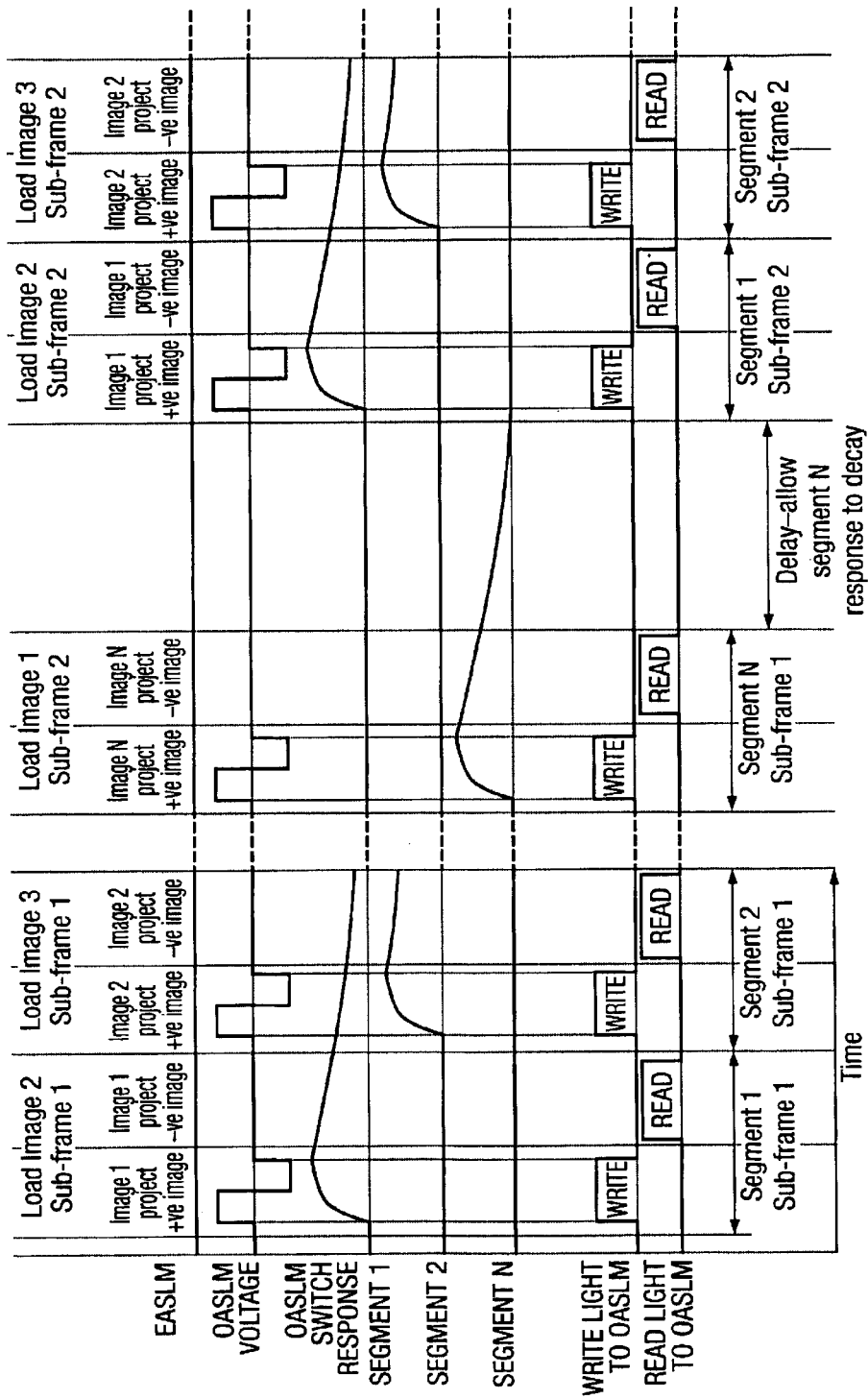
FIG. 4 is an alternative timing diagram for use in frame sequential colour displays.

FIG. 4 shows a timing information for such a colour system. This is similar to that of FIG. 3 in that information is written to and then read from segment 1 followed by segment 2 etc. A difference is that a first colour is written to and read from segments 1 to N in a first sub-frame, with a delay between sub-frame 1 ending and sub-frame 2 starting. This delay is to allow all segments to decay to their OFF state before a new colour is applied. The same delay occurs between all sub-frames with their associated colour.

Another difference between the systems of FIGS. 3 and 4 is that FIG. 4 uses a different EASLM. In this EASLM both positive and negative images are written into a buffer in the EASLM and projected alternately in adjacent time slots. Such loading takes place whilst an earlier negative image is projected by the EASLM (but not written to the OASLM). This means that e.g. second image (image 2) is being loaded into the buffer of the EASLM while the positive then the negative first image (image 1) is displayed on the EASLM.

The EASLM used in FIG. 3 may also be used to display a frame sequential colour display. Similarly the EASLM used in FIG. 4 may be used to provide a monochrome display.

Calculations may be made for the relative light outputs from a conventional bistable ferro electric OASLM output and that of a field sequential display as in FIG. 4. Comparison has been made for a FLCD and a Fréedericksz (nematic) cell both of layer thickness 1.5 μm, same frame time of 5555 μs, same write time of 100 μs, same number of segment N=25. The calculated brightness of an FLCD is 6 units and that of a Fréedericksz cell is 73 units. This shows that despite monostable operation the nematic cell's much improved diffraction efficiency can give improved brightness for a holographic display.

FIG. 5 shows a variation on the system of FIG. 1 and has been termed Direct Tiling. This FIG. 5 system uses a 3×3 array of EASLMs 30 and a 3×3 array of OASLM segments 31 separated by a relay lens array 32; each EASLM 30 and the OASLM 31 are similar to those in FIG. 4. Collimated light 33 from a light source 34 and collimating lens 35 illuminates each EASLM 30. A read light source 36 illuminates 37 the OASLM 31 via a polarising beam splitter 38. A Fourier lens 39 focuses images from the OASLM 31 to an observer 11. Control of voltage and images to the EASLMs 30 is from a controller 40 which also applies voltages to the OASLM 31. The OASLM may have segment electrodes as in FIGS. 1, 2, or a single electrode on each side. A 3-D display is observed by reflection of coherent light 37 from the read light source 36 off the front face of the OASLM 31. A benefit of the system of FIG. 5 is the much reduced frame time compared with that in FIG. 3.

What is claimed is:

1. A spatial light modulator imaging system, comprising:
   at least one electrically addressed spatial light modulator (EASLM);
   an optically addressed spatial light modulator (OASLM) including a layer of a nematic liquid crystal material contained between two cell walls provided in parallel in opposite direction alignment, the layer thickness d and the birefringence Δn at a wavelength λ approximately satisfy the equation Δn.d=λ/4;
   an optical system for directing light from the EASLM onto the OASLM;
   a controller for loading images on the EASLM then optically onto the OASLM;
   a controller for applying write voltages to the OASLM simultaneously with application of addressing light; and
   a read light source providing coherent light of one or more wavelengths for illuminating the OASLM to provide visible diffracted images,
   wherein the OASLM has at least one electrode that is segmented into a plurality of separately electrically addressable regions, and wherein the controller is adapted to apply voltages to the electrode so as to address different regions at different times,
   the arrangement being such that a plurality of images are read into the EASLM and then onto the OASLM at a rate sufficient to present a stable holographic image to an observer.

2. A spatial light modulator imaging system comprising:
at least one electrically addressed spatial light modulator EASLM;
a monostable optically addressed spatial light modulator OASLM arranged to receive addressing light from the EASLM through an optical system;
a controller for loading images onto the EASLM then optically onto the OASLM;
a controller for applying write voltages to the OASLM simultaneously with application of addressing light; and
a read light for illuminating the OASLM to provide visible images;
wherein the OASLM has at least one electrode that is segmented into a plurality of separately electrically addressable regions, and wherein the controller is adapted to apply write voltages to the electrode so as to address different regions at different times,
the arrangement being such that a plurality of images are read into the EASLM and thence onto the OASLM at a rate sufficient to present a stable image to an observer.

3. The system of claim 2 wherein the read light is incoherent light.

4. The system of claim 2 wherein the read light is incoherent light.

5. The system of claim 2 wherein the OASLM comprises a layer of a nematic liquid crystal material.

6. The system of claim 2 wherein the OASLM comprises a layer of nematic liquid crystal material contained between two cell walls provided with parallel in opposite direction alignment.

7. The system of claim 2 wherein the OASLM comprises a layer of a nematic liquid crystal material contained between two cell walls provided with parallel in opposite direction alignment with a surface tilt of less than 10°.

8. The system of claim 2 wherein the OASLM comprises a layer of a nematic liquid crystal material contained between two cell walls provided with parallel in opposite direction alignment, the layer thickness d and the birefringence $\Delta n$ at a wavelength $\lambda$ approximately satisfy the equation $\Delta n.d = \lambda/4$.

9. The system of claim 2 wherein the EASLM is a single EASLM whose output is arranged to be scanned sequentially over different areas of the OASLM.

10. The system of claim 2 wherein the OASLM is formed by a plurality of single OASLMs arranged to be addressed in a sequence by light from the EASLM.

11. The system of claim 2 wherein the controller contains computer generated holographic images for providing a diffraction pattern to be loaded into the EASLM and displayed to an observer as a three dimensional image.

12. The system of claim 2 wherein the EASLM is an m by n array of separately addressable EASLMs and the OASLM is an m-by-n array of segments or separate OASLMs.

13. The system of claim 2 wherein the OASLM contains a layer of nematic liquid crystal material arranged in a twisted configuration (90°, 180°, 270°, 360° of twist).

* * * * *